United States Patent
Van Mieghem et al.

(10) Patent No.: US 11,454,259 B2
(45) Date of Patent: Sep. 27, 2022

(54) HYDRAULIC ASSEMBLY

(71) Applicant: DRiV Automotive Inc., Lake Forest, IL (US)

(72) Inventors: Bart Van Mieghem, Lummen (BE); Geert Sas, Meerhout (BE)

(73) Assignee: DRiV Automotive Inc., Skokie, IL (US)

( * ) Notice: Subject to any disclaimer, the term of this patent is extended or adjusted under 35 U.S.C. 154(b) by 146 days.

(21) Appl. No.: 16/750,664

(22) Filed: Jan. 23, 2020

(65) Prior Publication Data

US 2021/0231136 A1 Jul. 29, 2021

(51) Int. Cl.
| | |
|---|---|
| *F15B 15/14* | (2006.01) |
| *F16J 15/3236* | (2016.01) |
| *F16J 15/3232* | (2016.01) |
| *F16J 9/12* | (2006.01) |
| *B60G 17/027* | (2006.01) |

(52) U.S. Cl.
CPC ............ *F15B 15/1452* (2013.01); *F16J 9/12* (2013.01); *F16J 15/3232* (2013.01); *F16J 15/3236* (2013.01); *B60G 17/0272* (2013.01)

(58) Field of Classification Search
CPC ............... F15B 15/1452; F16J 15/3232; F16J 15/3236; F16J 9/12; B60G 2202/413; B60G 17/0272
See application file for complete search history.

(56) References Cited

U.S. PATENT DOCUMENTS

| | | | | |
|---|---|---|---|---|
| 3,576,153 | A | | 4/1971 | Doutt |
| 3,601,419 | A | * | 8/1971 | Fern ..................... F16J 15/3236 277/436 |
| 4,709,932 | A | * | 12/1987 | Edlund ................ F16J 15/3232 277/560 |
| 5,401,053 | A | * | 3/1995 | Sahm .................... B60G 17/016 188/266.5 |
| 5,539,639 | A | * | 7/1996 | Devaud .............. B60G 17/0152 280/5.504 |
| 6,454,273 | B1 | * | 9/2002 | Kashima ................ F16J 15/164 277/437 |
| 8,387,990 | B2 | | 3/2013 | Castleman et al. |
| 8,616,563 | B2 | * | 12/2013 | Lee ..................... B60G 17/0272 280/5.514 |
| 9,216,722 | B2 | * | 12/2015 | Kang .................... B60T 11/236 |
| 9,248,818 | B2 | | 2/2016 | Kane et al. |
| 9,272,598 | B2 | * | 3/2016 | Kazmirski ......... B60G 17/0272 |
| 10,308,090 | B2 | * | 6/2019 | Stolle ..................... B60G 15/06 |
| 10,851,865 | B2 | * | 12/2020 | Forster .................... F16F 9/368 |

(Continued)

FOREIGN PATENT DOCUMENTS

| | | |
|---|---|---|
| DE | 102005030189 A1 | 1/2006 |
| DE | 102014208085 A1 | 11/2014 |

(Continued)

*Primary Examiner* — Dustin T Nguyen
(74) *Attorney, Agent, or Firm* — Bejin Bieneman PLC

(57) ABSTRACT

An assembly includes a spring seat, a spring seat insert, and a seal. The spring seat is slidable along the spring seat insert to define an expandable fluid chamber therebetween. The spring seat includes a groove defining a mating surface. The seal is between the spring seat and the spring seat insert. The seal includes a mating portion at the first end engageable with the mating surface of the groove to prevent fluid from exiting the fluid chamber.

5 Claims, 6 Drawing Sheets

(56) References Cited

U.S. PATENT DOCUMENTS

| | | | |
|---|---|---|---|
| 2011/0115168 A1* | 5/2011 | Miller | F16J 15/3236 277/562 |
| 2015/0123351 A1* | 5/2015 | Nakamura | F16J 15/3236 277/562 |
| 2019/0242480 A1* | 8/2019 | Nakagawa | F16J 15/10 |

FOREIGN PATENT DOCUMENTS

| | | |
|---|---|---|
| DE | 102014208089 A1 | 11/2014 |
| EP | 0525290 B1 | 12/1995 |

* cited by examiner

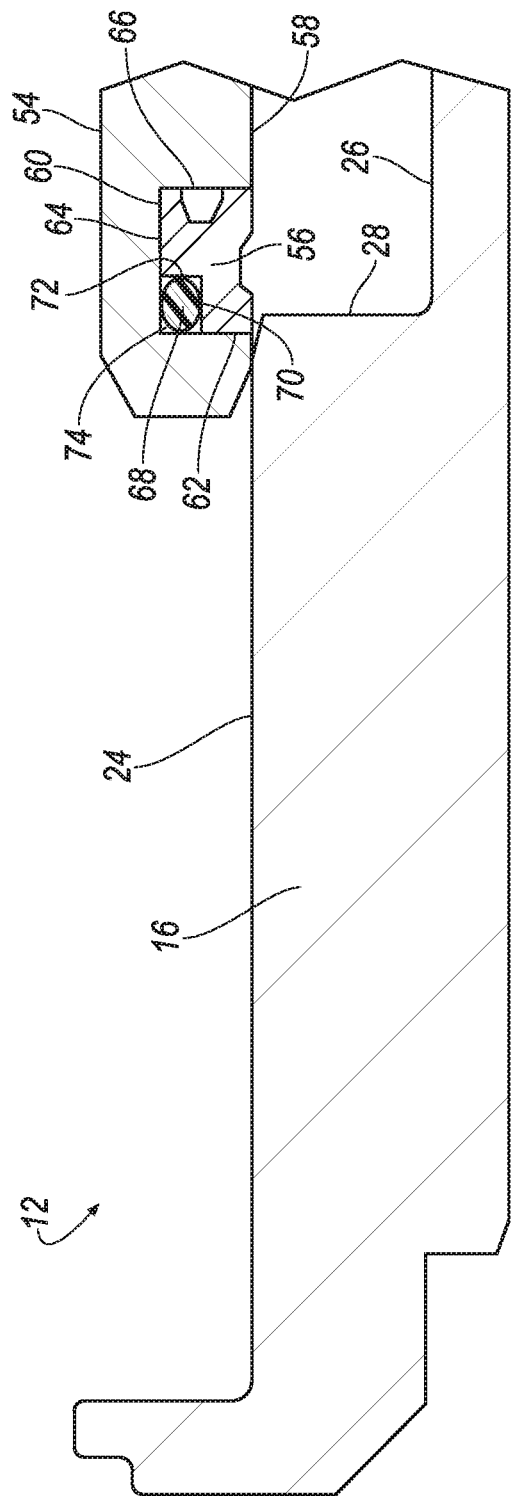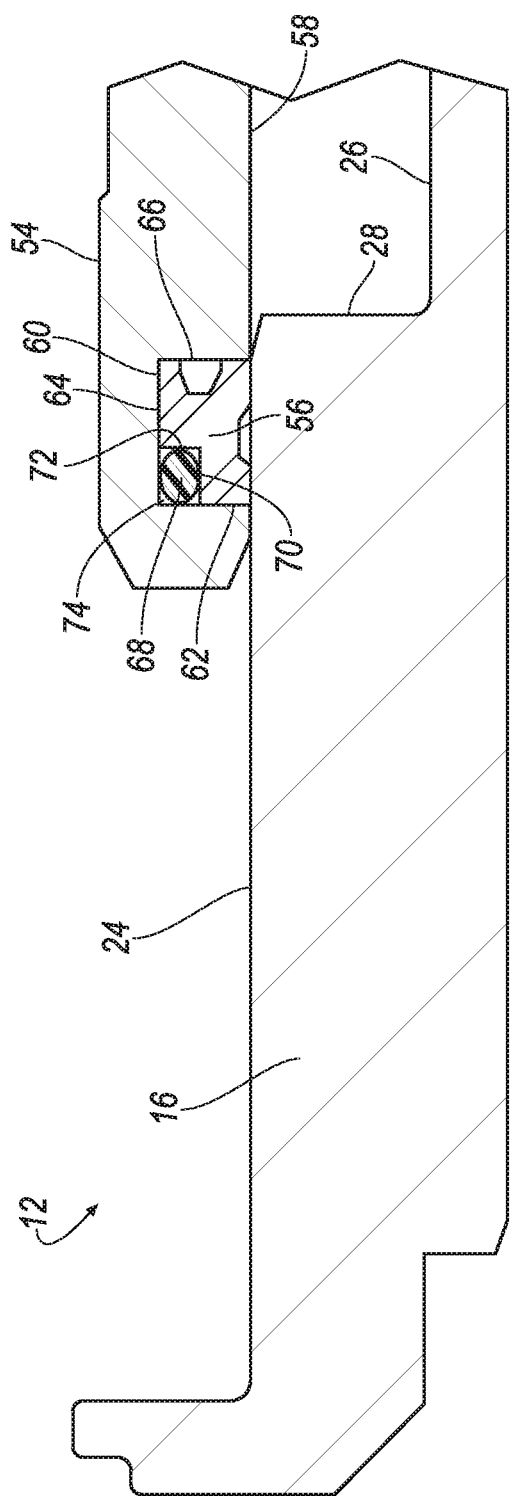

HYDRAULIC ASSEMBLY

BACKGROUND

Hydraulic assemblies allow components in a vehicle to be moved by pumping fluid into an expandable chamber to separate a spring seat from a spring seat insert. Vehicles use hydraulic assemblies in suspensions. An operator of the vehicle can actuate the hydraulic assemblies to raise and lower a vehicle body relative to a vehicle wheel to compensate for variations in a road surface. For example, off-road driving may require an increased ride height to avoid debris on the ground surface. In another example, a lower ride height may allow the vehicle to operate in a more aerodynamic manner. In yet another example, the hydraulic assembly can raise a nose of the vehicle to avoid a speed bump or an increased road grade.

The hydraulic fluid in the assemblies can leak if seals are not properly installed. Typical seals may be able to be installed in an orientation other than an intended orientation. When installed improperly, the seals may allow fluid to exit the expandable chamber, causing the fluid to leak from the hydraulic assembly. In particular, the seal may be substantially symmetrical, so installing the seal backwards may appear to be the correct installation. However, this backward installation may allow fluid to leak from the assembly. There remains an opportunity to design a seal for a hydraulic assembly that is installable only in a specified orientation to properly seal the expandable chamber.

BRIEF DESCRIPTION OF THE DRAWINGS

FIGS. 7A-7B are cross-sectional views of a second embodiment of a hydraulic assembly.

DETAILED DESCRIPTION

Figure 1:
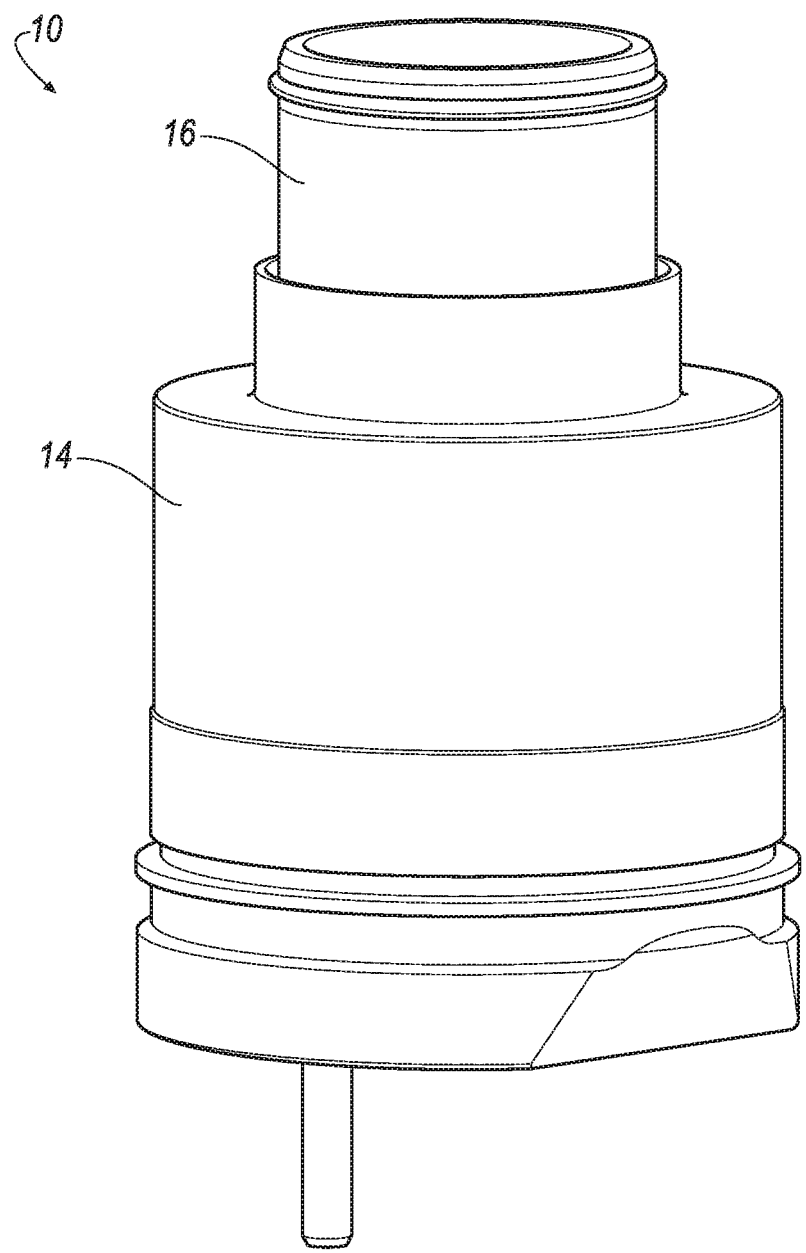
FIG. 1 is a view of a hydraulic assembly.

A seal for a hydraulic assembly that can only be installed in one orientation prevents leakage of hydraulic fluid by ensuring that the seal can only be installed correctly. Thus, when a spring seat of the hydraulic assembly is installed onto a spring seat insert of the hydraulic assembly, a fluid chamber defined therebetween is sealed. If the seal is placed incorrectly onto the spring seat of the hydraulic assembly, the seal prevents installation of the spring seat onto the spring seat insert, indicating to the installer that the seal is incorrectly placed. By designing the seal to be installed only in a specified orientation, when the spring seat slides onto the spring seat insert unobstructed by the seal, the seal is oriented to prevent leakage of the fluid chamber. That is, the seal provides a poka-yoke installation of the hydraulic assembly that prevents fluid from exiting the fluid chamber.

A hydraulic assembly 10, 12 includes a spring seat 14, 54, a spring seat insert 16, and a seal 18, 56. The spring seat 14, 54 includes an interior surface 20, 58 and a wall 22. The spring seat insert 16 includes an exterior surface 24, an interior surface 26, and a second wall 28 extending from the exterior surface 24 to the interior surface 26. The spring seat 14, 54 is slidable along the exterior surface 24 of the spring seat insert 16 to define an expandable fluid chamber 30 between the second wall 28 of the spring seat insert 16, the interior surface 26 of the spring seat insert 16, the interior surface 20, 58 of the spring seat 14, 54, and the wall 22 of the spring seat 14, 54.

As shown in FIGS. 2-6B, the spring seat 14 defines a groove 32 in the interior surface 20. The groove 32 has a first vertical surface 34, a horizontal surface 36, a mating surface 38 extending from the first vertical surface 34 to the horizontal surface 36, and a second vertical surface 40 extending from the horizontal surface 36. The mating surface 38 is a chamfered surface, i.e., an angled surface that extends from the horizontal surface 36 to the first vertical surface 34. The seal 18 is between the spring seat 14 and the spring seat insert 16. The seal 18 has a first end 42, a second end 44 opposite the first end 42, a mating portion 46 at the first end 42, a first flange 48 disposed at the second end 44, and a second flange 50 disposed at the second end 44. The mating portion 46 is engageable with the mating surface 38 of the groove 32. The first flange 48 is engageable with the horizontal surface 36 and the second vertical surface 40. The second flange 50 is engageable with the second vertical surface 40 and the exterior surface 24 of the spring seat insert 16. The first and second flanges 48, 50 are arranged to prevent fluid from exiting the fluid chamber 30.

The hydraulic lifting assembly 10 includes the spring seat 14. The spring seat 14 is a substantially cylindrical object that is disposed around the spring seat insert 16. The spring seat 14 slides along the spring seat insert 16 to lift a vehicle component, e.g., components of a vehicle suspension. The spring seat 14 includes the interior surface 20 and the wall 22. The wall 22 extends from the interior surface 20 toward a central axis A of the hydraulic assembly 10. That is, the wall 22 is a cylindrical extension from the spring seat 14 that engages the spring seat insert 16.

The interior surface 20 defines the groove 32. The "groove" 32 is a recess in the spring seat 14 that receives the seal 18. The groove 32 may be machined out of the spring seat 14. The groove 32 has a first vertical surface 34, a horizontal surface 36, a mating surface 38 extending from the first vertical surface 34 to the horizontal surface 36, and a second vertical surface 40 extending from the horizontal surface 36. That is, the groove 32 is asymmetrical in the cross-sectional view shown in FIG. 3. The groove 32 receives the seal 18, as described below and shown in FIGS. 2, 5A-5B, in a specific orientation to prevent backwards insertion of the seal 18. The mating surface 38 is a diagonal surface transverse to both the first vertical surface 34 and the horizontal surface 36. The mating surface 38 may be designed to accept the seal 18 in a specific orientation, as described below. The spring seat 14 may include a plurality of grooves 32, each groove 32 including a respective seal 18 to prevent leaking of the fluid chamber 30 from either side of the fluid chamber 30.

Figure 2:
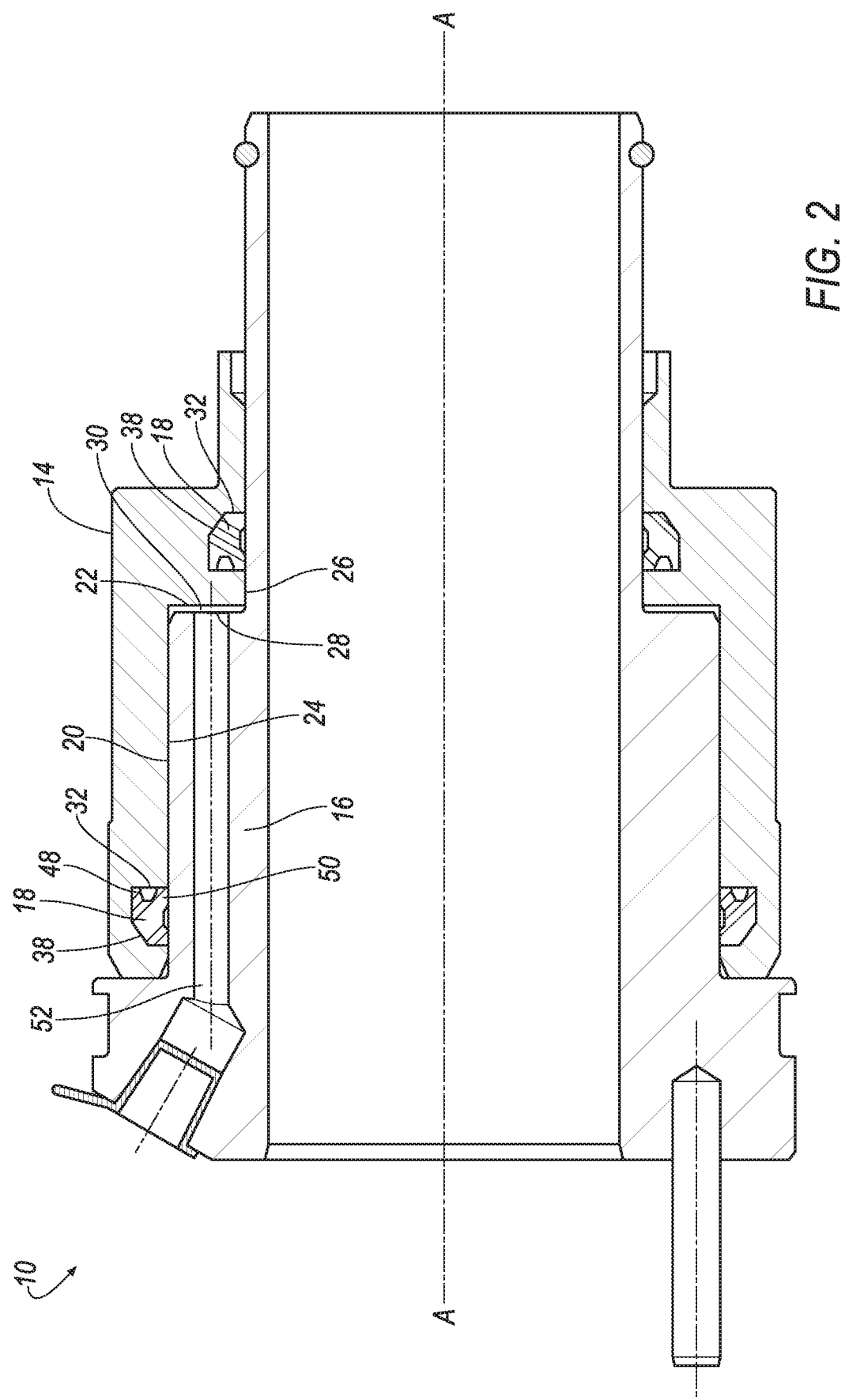
FIG. 2 is a cross-sectional view of the hydraulic assembly.
Figure 3:
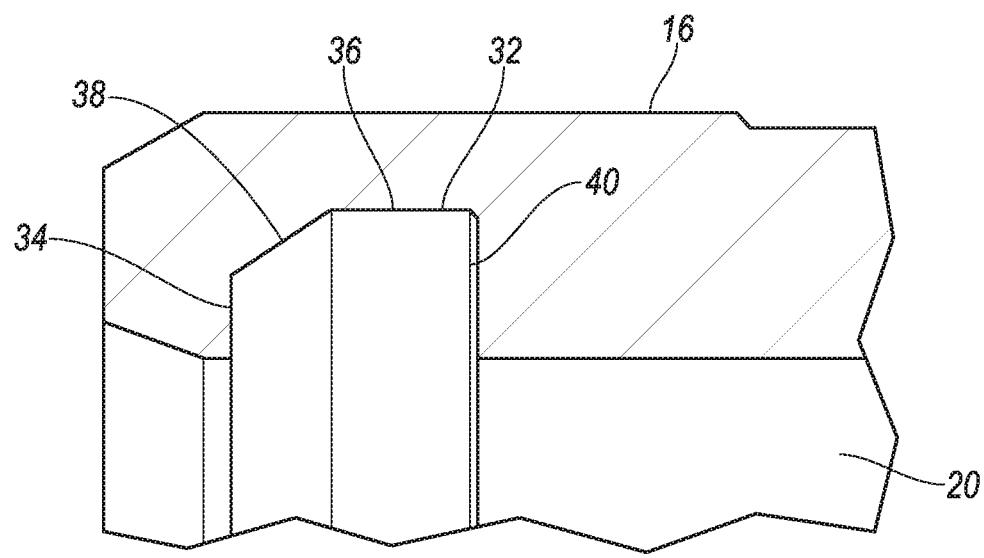
FIG. 3 is a cross-sectional view of a spring seat including a groove.

The hydraulic assembly 10 includes the spring seat insert 16. The spring seat insert 16 may be disposed on a part of a vehicle component to allow movement of the spring seat 14. The spring seat insert 16 includes an exterior surface 24, an interior surface 26, and a second wall 28 extending from the exterior surface 24 to the interior surface 26. The interior surface 26 is disposed closer to the central axis A of the hydraulic assembly 10 than the exterior surface 24, as shown in FIG. 2. The second wall 28 extends vertically from the exterior surface 24 to the interior surface 26. That is, the exterior surface 24 and the interior surface 26 extend substantially horizontally and the second wall 28 extends vertically therebetween.

The hydraulic assembly 10 defines the expandable fluid chamber 30. The expandable fluid chamber 30 is defined between the second wall 28 of the spring seat insert 16, the interior surface 26 of the spring seat insert 16, the interior surface 20 of the spring seat 14, and the wall 22 of the spring seat 14. That is, the expandable fluid chamber 30 is a cylindrical void or cavity between the spring seat 14 and the spring seat insert 16. When fluid (such as hydraulic fluid) is provided to the expandable fluid chamber 30, the fluid chamber expands from a first position to a second position, moving the component attached to the spring seat 14. In the first position, little to no fluid is in the fluid chamber 30, and the wall 22 of the spring seat 14 is disposed near the second wall 28 of the spring seat insert 16. Upon inserting fluid into the fluid chamber 30, the fluid pushes against the wall 22 of the spring seat 14, and the fluid chamber 30 may expand to the second position in which the wall 22 of the spring seat 14 is disposed farther from the second wall 28 of the spring seat insert 16 than in the first position. That is, inserting fluid into the fluid chamber 30 moves the spring seat 14 and the vehicle component attached thereto. The spring seat insert 16 can include a fluid line 52 that provides the fluid to the fluid chamber 30. That is, the fluid line 52 may be connected to a fluid pump (not shown) that injects fluid into the fluid chamber 30, pushing the spring seat 14 relative to the spring seat insert 16.

The hydraulic lifting assembly 10 includes the seal 18, as shown in FIGS. 2, 4-6B. The seal 18 prevents fluid from exiting the fluid chamber 30. The seal 18 is inserted into the groove 32 to seal the spring seat 14 from the spring seat insert 16. The seal 18 slides along the spring seat insert 16 with the spring seat 14. The seal 18 is designed to prevent installation of the spring seat 14 onto the spring seat insert 16 when the seal 18 is installed backwards in the groove 32. That is, the seal 18 is designed in a manner that only allows the spring seat 14 to be placed onto the spring seat insert 16 when the seal 18 is installed in the spring seat 14 correctly. The seal 18 may be a flexible, fluid-tight material, e.g., silicone, rubber, etc. The hydraulic lifting assembly 10 may include a plurality of seals 18, as shown in FIG. 2, to seal the fluid chamber 30.

The seal 18 has a first end 42 and a second end 44, as shown in FIGS. 4-6B. The first end 42 engages the first vertical surface 34 of the groove 32. The seal 18 includes a mating portion 46 between the first end 42 and the second end 44. The mating portion 46 of the seal 18 is a portion transverse to the first end 42, i.e., chamfered. That is, the mating portion 46 of the seal 18 is chamfered, the mating surface 38 of the groove 32 is chamfered, and the mating portion 46 of the seal 18 is shaped to mate with the mating surface 38 of the groove 32 when the seal 18 is installed in the groove in the correct orientation.

Figure 4:
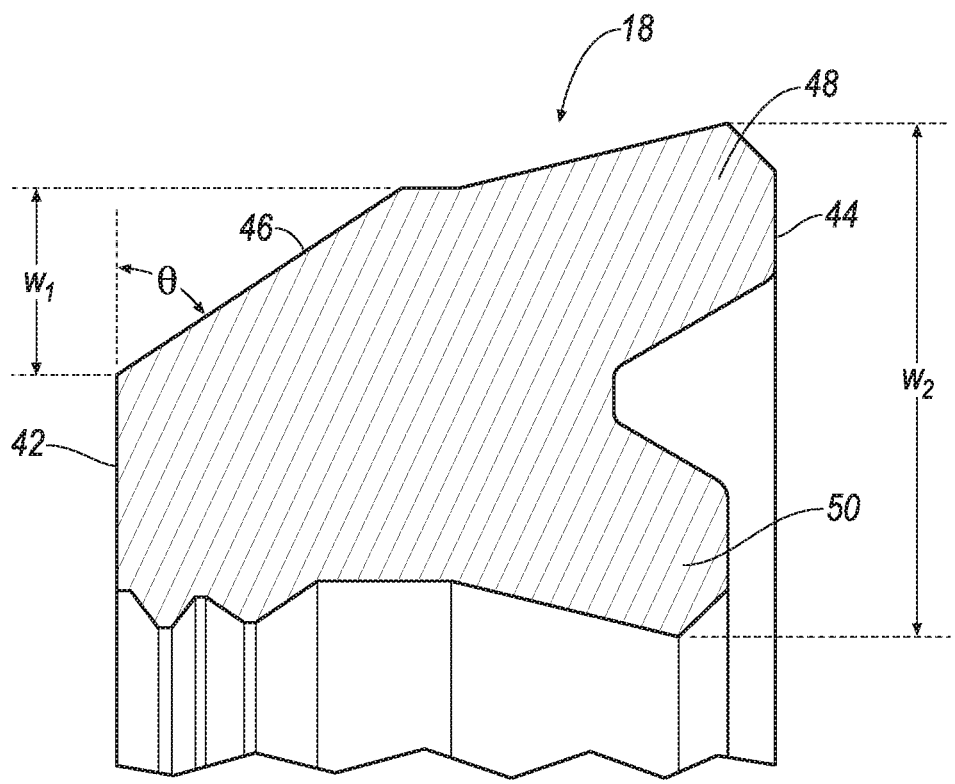
FIG. 4 is a cross-sectional view of a seal.

The first end 42 defines a vertical surface, and the mating portion 46 defines an acute angle θ with the vertical surface. For example, as shown in FIG. 4, the acute angle θ can be substantially 56 degrees. Alternatively, the acute angle θ can be a different angle based on the dimensions of the seal 18 that is a suitable angle. When the mating portion 46 of the seal 18 engages the mating surface 38 of the groove 32, the seal 18 prevents fluid from exiting the fluid chamber 30. That is, the mating portion 46 of the seal 18 and the mating surface 38 of the groove 32 are designed to substantially mate, sealing the groove 32 and the fluid chamber 30. The mating portion 46 may be shaped according to the dimensions of the mating surface 38 of the groove 32, i.e., the mating portion 46 may entirely cover the mating surface 38 to prevent leaking of the fluid chamber 30.

The mating portion 46 of the seal 18 has a width $w_1$. The second end 44 of the seal 18 has a second width $w_2$. The ratio of the width $w_1$ to the second width $w_2$ can be determined based on the size of the mating portion 46. For example, the width $w_1$ can be substantially 2 millimeters (mm) and the second width $w_2$ can be substantially 5.4 mm, i.e., the ratio of the width $w_1$ to the second width $w_2$ can be substantially 37 percent. Alternatively, the width $w_1$ and the second width $w_2$ can be determined such that the ratio of the width $w_1$ to the second width $w_2$ can be a suitable value to secure the seal 18 in the groove 32. That is, the seal 18 may be dimensioned to fill the groove 32 when the mating portion 46 of the seal 18 engages the mating surface 38 of the groove 32.

Figure 5A:
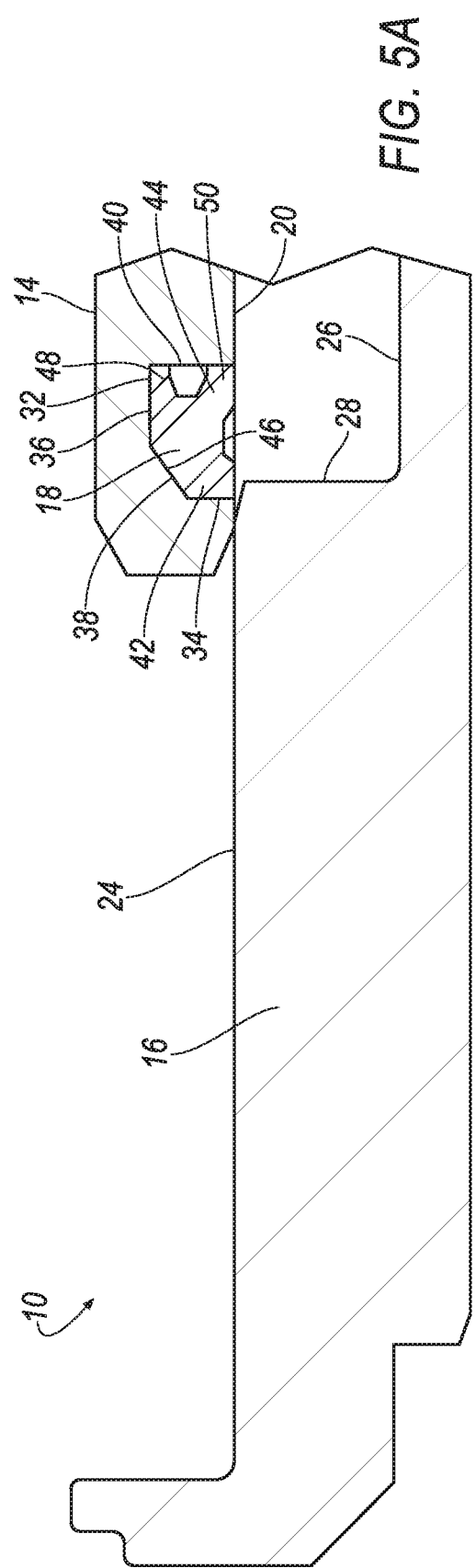
FIGS. 5A-5B are cross-sectional views of the hydraulic assembly when the seal is installed in the groove in a first orientation.
Figure 5B:
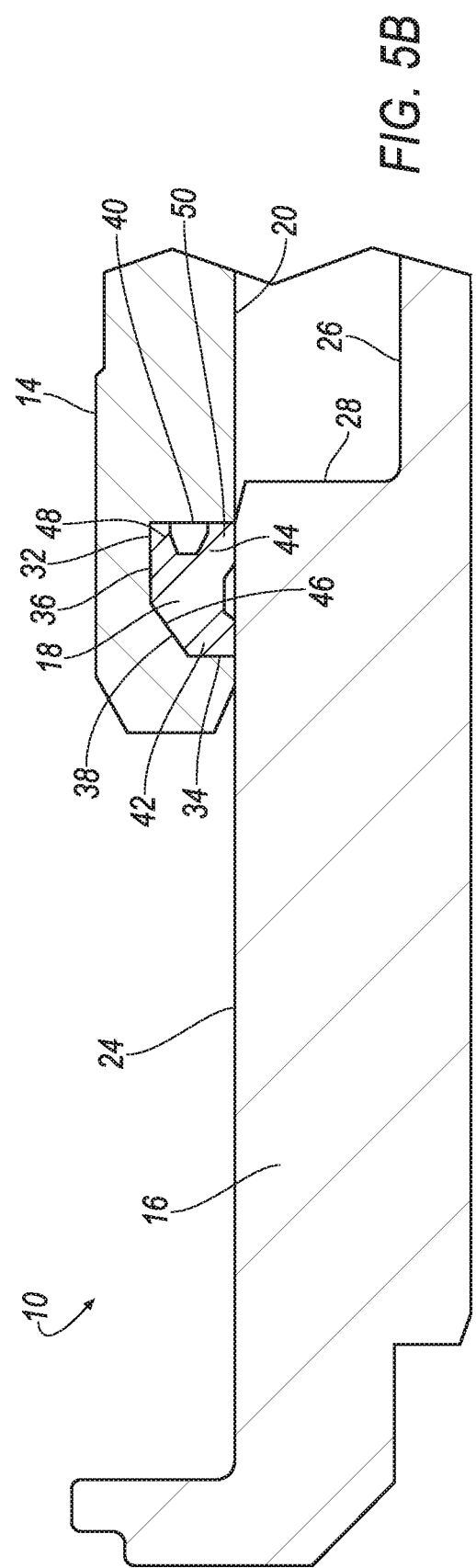
Figure 6A:
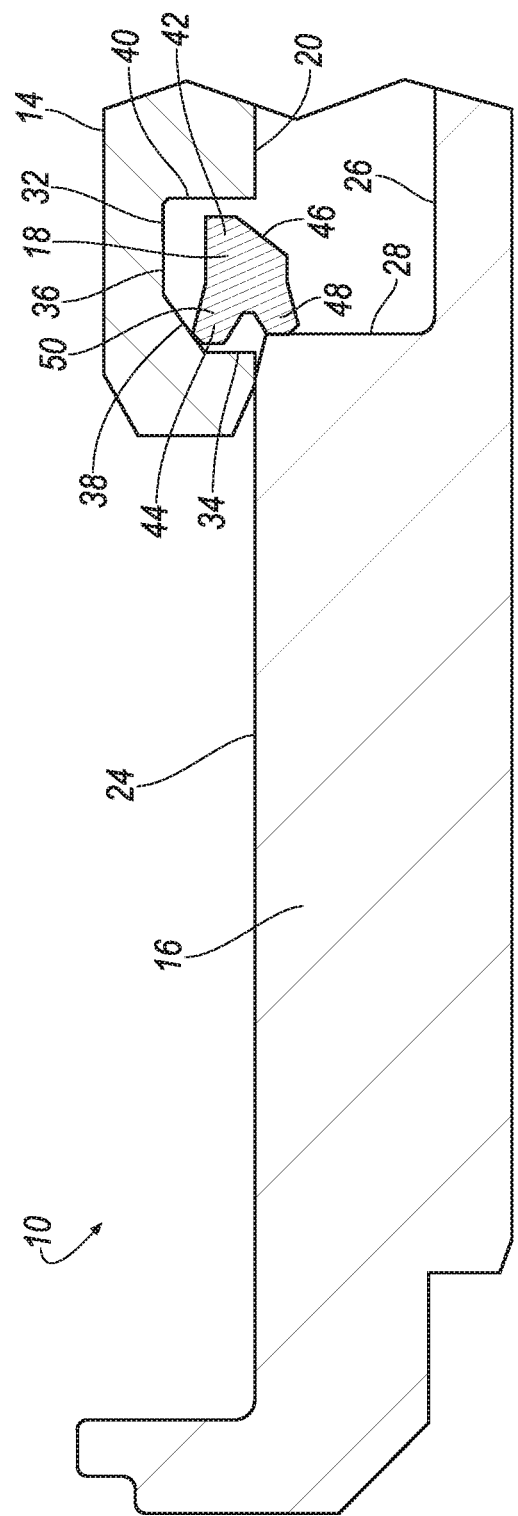
FIGS. 6A-6B are cross-sectional views of the hydraulic assembly when the seal is installed in the groove in an orientation transverse to the first orientation.
Figure 6B:
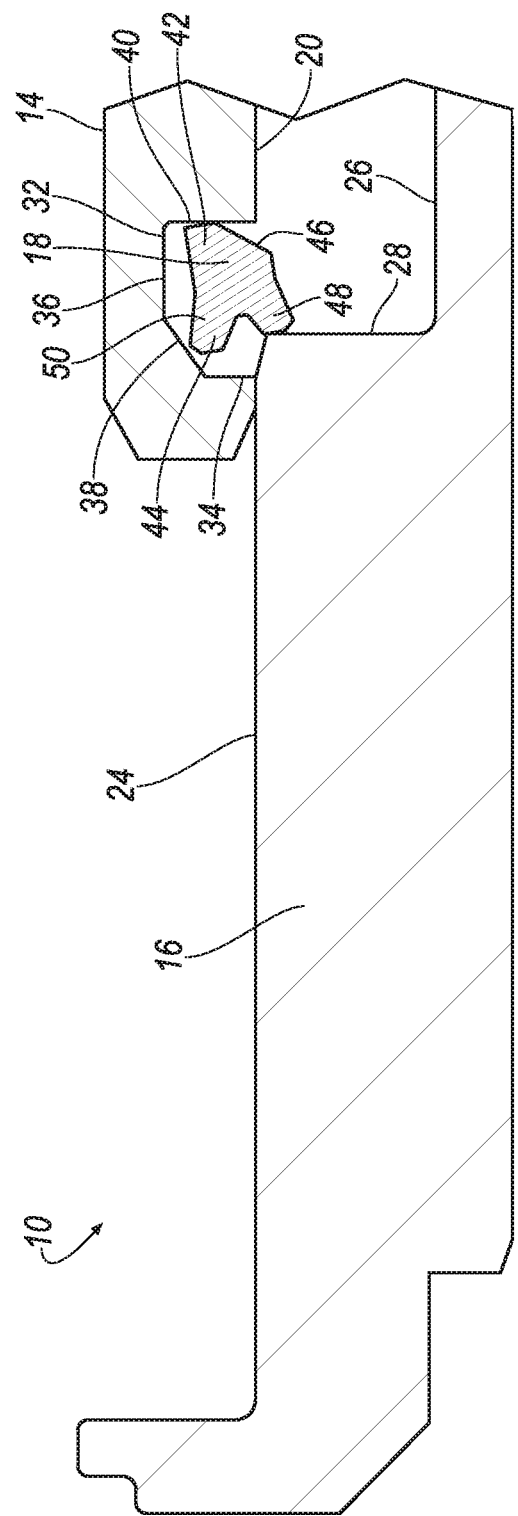

The seal 18 includes a first flange 48 disposed at the second end 44 and a second flange 50 disposed at the second end 44, as shown in FIGS. 2, 4-6B. The first flange 48 may be disposed vertically away from the second flange 50 relative to the spring seat insert 16. The first flange 48 may be engageable with the horizontal surface 36 and the second vertical surface 40 of the groove 32. The second flange 50 may be engageable with the second vertical surface 40 of the groove 32 and the exterior surface 24 of the spring seat insert 16. The first and second flanges 48, 50 may be arranged to prevent fluid from exiting the fluid chamber 30. That is, the first flange 48 and the second flange 50 may be designed to prevent sliding of the spring seat 14 along the spring seat insert 16 when at least one of the first flange 48 or the second flange 50 engages the mating surface 38. When one of the flanges 48, 50 engages the mating surface 38, as shown in FIGS. 6A-6B, one of the other flanges 48, 50 pushes against the second wall 28 of the spring seat insert 16, preventing the spring seat 14 from moving onto the spring seat insert 16. Alternatively, the first end 42 of the seal may engaged the second wall 28, preventing the spring seat 14 from moving onto the spring seat insert 16. Thus, the spring seat 14 may not be installed onto the spring seat insert 16 when one of the flanges 48, 50 engages the mating surface 38, and the seal 18 must be realigned to properly fit into the groove 32.

The seal 18 is designed to fit in the groove 32 in a first orientation, as shown in FIGS. 5A-5B. In the first orientation, the mating portion 46 of the seal 18 engages the mating surface 38 of the groove 32, sealing the fluid chamber 30. That is, the first orientation is the specified orientation that seals the fluid chamber 30 and allows proper installation of the spring seat 14 onto the spring seat insert 16. The seal 18 may be designed to seal the fluid chamber 30 when the seal 18 is in the first orientation and may be designed not to seal the fluid chamber 30 in an orientation transverse to the first orientation. For example, if the seal 18 is placed backwards in the groove 32, as shown in FIGS. 6A-6B, the seal 18 may not seal the fluid chamber 30. The seal 18 may be designed to allow sliding of the spring seat 14 along the exterior surface 24 of the spring seat insert 16 when the seal 18 is disposed in the groove 32 in a first orientation and to prevent sliding of the spring seat 14 along the exterior surface 24 of the spring seat insert 16 when the seal 18 is disposed in the groove 32 in an orientation transverse to the first orientation. That is, the seal 18 is designed to fit into the groove 32 only in the first orientation. Thus, when an installer places the seal 18 in the groove 32, the installer can determine whether the seal 18 is installed correctly by determining whether the spring seat 14 can be installed onto the spring seat insert 16. If the spring seat 14 cannot be installed onto the spring seat insert 16, the installer can adjust the orientation of the seal 18 until the seal 18 is in the first orientation.

FIGS. 7A-7B illustrate a second embodiment of a hydraulic assembly 12. The hydraulic assembly 12 includes a spring seat 54, the spring seat insert 16, and a seal 56. The spring seat 54 defines a groove 60. The groove 60 has a first vertical surface 62, a horizontal surface 64, and a second vertical surface 66. The horizontal surface 64 extends between the first vertical surface 62 and the second vertical surface 66. The intersection of the first vertical surface 62 and the horizontal surface 64 define a mating surface 74 of the groove 60.

The hydraulic assembly 12 includes a mating insert 68. The mating insert 68 is disposed between the seal 56 and the first vertical surface 62. The mating insert 68 prevents backward insertion of the seal 56 into the groove 60. The mating insert 68 can be a ring of a suitable material, e.g., metal, plastic, a composite, etc. An installer can place the mating insert 68 into the groove 60 prior to placing the seal 56 into the groove 60. Alternatively, the mating insert 68 may be integral with the spring seat 54.

The seal 56 includes a mating portion 70 and a wall 72. The mating insert 68 engages the mating portion 70 and the wall 72. The mating portion 70 is a substantially flat portion that engages the mating insert 68. When the seal 56 is installed in the correct orientation, the mating insert 68 is between the mating surface of the groove 60 and the mating portion 70 of the seal 56. That is, the mating portion 70 and the wall 72 may be shaped to fit around the mating insert 68 and to press the mating insert 68 against the mating surface 74 of the groove 60. When the seal 56 is installed in an orientation transverse to the first orientation, one of the flanges (unnumbered in FIGS. 7A-7B) may engage the mating insert 68, placing a portion of the seal 56 into the fluid chamber 30 and preventing the spring seat 54 from sliding onto the spring seat insert 16.

A method of assembling a hydraulic assembly 10, 12 includes inserting a seal 18, 56 into a groove 32, 60 of a spring seat 14, 54, engaging a mating portion 46, 70 of the seal 18, 56 to a mating surface 38, 74 of the groove 32, 60, sliding the spring seat 14, 54 onto a spring seat insert 16 to define a fluid chamber 30 therebetween, and sealing the fluid chamber 30 from the groove 32 with the seal 18, 56.

An installer in a manufacturing facility may assemble the hydraulic assembly 10 described in the Figures. The installer may insert the seal 18 into the groove 32 of the spring seat 14 such that the mating portion 46 of the seal 18 engages the mating surface 38 of the groove 32. Because the mating portion 46 is designed to engage the mating surface 38, installing the seal 18 such that the mating portion 46 engages the mating surface 38 of the groove 32 places the seal 18 in the proper orientation to seal the fluid chamber 30.

An installer may assemble the hydraulic assembly 12 described in the Figures. The installer may insert a mating insert 68 into the groove 60 of the spring seat 54. The installer may then insert the seal 56 into the groove 60. The mating insert 68 may be disposed between the seal 56 and the mating surface 74 to prevent backwards installation of the seal 56 into the groove 60.

The method can further include sliding the spring seat 14, 54 onto the spring seat insert 16 to enclose the groove 32, 60 by the seal 18, 56 and the exterior surface 24 of the spring seat insert 16. The installer can slide the spring seat 14, 54 onto the spring seat insert 16, defining the fluid chamber 30. The seal 18, 56, being in the proper orientation to seal the fluid chamber 30, allows the spring seat 14, 54 to slide onto the spring seat insert 16. The groove 32, 60 thus is enclosed by the seal 18, 56 and the exterior surface 24 of the spring seat insert 16. By enclosing the groove 32, 60, fluid from the fluid chamber 30 may not leak through the groove 32, 60.

The method can further include engaging a flange 48, 50 of the seal 18 to the mating surface 38 of the groove 32 and sliding the spring seat 14 onto the spring seat insert 16 to expose the groove 32 to the interior surface 20. When the seal 18 is in an orientation transverse to the first orientation, i.e., in an orientation that is not the proper orientation to seal the fluid chamber 30, the flange 48, 50 of the seal 18 may engage the mating surface 38. The flange 48, 50 holds the seal 18 such that the first end 42 of the seal 18 and/or another flange 48, 50 of the seal 18 cannot be placed into the groove 32, causing the groove 32 to be exposed to the interior surface 26 of the spring seat insert 16. When the groove 32 is exposed to the interior surface 26 of the spring seat insert 16, the spring seat 14 cannot be slid entirely onto the spring seat insert 16, preventing installation of the spring seat 14. Thus, the flange 48, 50 and the mating surface 38 prevent installation of the spring seat 14 when the seal 18 is not in the first orientation.

The method can further include engaging a flange 48, 50 of the seal 18 to the mating surface 38 of the groove 32 or a flange of the mating insert 68 to prevent sliding the spring seat 14, 54 onto the spring seat insert 16. As described above, engaging one of the flanges 48, 50 of the seal 18, 56 to the mating surface 38 or the mating insert 68 forces the first end 42 and/or the other flange 48, 50 of the seal 18, 56 past the groove 32, 60, and when the installer attempts to slide the spring seat 14, 54 onto the spring seat insert 16, the first end 42 and/or the other flange 48, 50 of the seal 18, 56 is caught between the spring seat 14, 54 and the second wall 28 of the spring seat insert 16. The seal 18, 56 thus prevents sliding the spring seat 14, 54 onto the spring seat insert 16.

The method can further include inserting the seal 18, 56 in a first orientation to allow sliding the spring seat 14, 54 onto the spring seat insert 16. As described above, inserting the seal 18, 56 in the first orientation causes the mating portion 46, 70 of the seal 18, 56 to engage the mating surface 38, 74 of the groove 32, 60. Thus, the seal 18, 56 is entirely contained in the groove 32, 60 and does not prevent the spring seat 14, 54 from sliding onto the spring seat insert 16. The seal 18, 56 prevents fluid from exiting the fluid chamber 30 when the seal 18, 56 is in the first orientation.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:
1. An assembly comprising:
a spring seat including an interior surface and a wall;
a spring seat insert including an exterior surface, an interior surface, and a second wall extending from the exterior surface to the interior surface, the spring seat slidable along the exterior surface of the spring seat insert to define an expandable fluid chamber between the second wall of the spring seat insert, the interior surface of the spring seat insert, the interior surface of the spring seat, and the wall of the spring seat;
a groove defined in the interior surface of the spring seat, the groove having a first vertical surface, a horizontal surface, and a second vertical surface extending from the horizontal surface;

a seal between the spring seat and the spring seat insert, the seal having a first end, a second end opposite the first end, a mating portion at the first end, a first flange disposed at the second end engageable with the horizontal surface and the second vertical surface, and a second flange disposed at the second end engageable with the second vertical surface and the exterior surface of the spring seat insert, the first and second flanges arranged to prevent fluid from exiting the fluid chamber; and a mating insert separate of the spring seat, the mating insert disposed between the mating portion of the seal and the first vertical surface and the horizontal surface of the groove; and wherein the seal is designed to allow sliding of the spring seat along the exterior surface of the spring seat insert when the seal is disposed in the groove in a first orientation and to prevent sliding of the spring seat along the exterior surface of the spring seat insert when the seal is disposed in the groove in an orientation transverse to the first orientation.

2. The assembly of claim 1, wherein the mating portion of the seal has a width, and the second end of the seal has a second width, and a ratio of the width to the second width is substantially 37 percent.

3. The assembly of claim 1, wherein the seal is dimensioned to fill the groove when the mating insert is disposed between the mating portion of the seal and the first vertical surface and the horizontal surface of the groove.

4. The assembly of claim 1, wherein the seal is designed to seal the fluid chamber when the seal is in a first orientation and designed not to seal the fluid chamber in an orientation transverse to the first orientation.

5. The assembly of claim 1, wherein the spring seat insert includes a fluid line that provides fluid to expand the expandable fluid chamber.

\* \* \* \* \*